(12) United States Patent
Nagao et al.

(10) Patent No.: US 7,896,124 B2
(45) Date of Patent: Mar. 1, 2011

(54) EXHAUST SYSTEMS AND MOTORCYCLES INCLUDING SAME

(75) Inventors: Daisuke Nagao, Long Beach, CA (US); Kenji Tamura, Redondo Beach, CA (US)

(73) Assignee: Honda Motor Company, Ltd., Tokyo (JP)

( * ) Notice: Subject to any disclaimer, the term of this patent is extended or adjusted under 35 U.S.C. 154(b) by 297 days.

(21) Appl. No.: 12/254,942

(22) Filed: Oct. 21, 2008

(65) Prior Publication Data

US 2010/0096210 A1   Apr. 22, 2010

(51) Int. Cl.
   *B60K 13/04* (2006.01)
(52) U.S. Cl. .................. 180/309; 180/219; 180/225; 180/296; 60/312
(58) Field of Classification Search .......................... None
   See application file for complete search history.

(56) References Cited

U.S. PATENT DOCUMENTS

| | | | |
|---|---|---|---|
| 3,385,052 A | 5/1968 | Holtermann et al. | |
| 3,605,940 A | 9/1971 | Christensen | |
| 3,665,712 A | 5/1972 | Tenney | |
| 3,726,084 A * | 4/1973 | Meier et al. | 60/605.1 |
| 3,875,744 A | 4/1975 | Brooks et al. | |
| 4,487,288 A * | 12/1984 | Watanabe et al. | 181/238 |
| 4,497,293 A * | 2/1985 | Takagi et al. | 123/196 A |
| 4,809,800 A * | 3/1989 | Suzuki | 180/219 |
| 5,979,583 A | 11/1999 | Amino et al. | |
| 6,052,990 A * | 4/2000 | Gecker, Jr. | 60/312 |
| 6,105,701 A | 8/2000 | Buell | |
| D454,320 S | 3/2002 | Martin | |
| D455,678 S | 4/2002 | Schroeder et al. | |
| 6,655,134 B2 | 12/2003 | Nakayasu et al. | |
| 6,719,084 B2 * | 4/2004 | Kuji et al. | 180/309 |
| 6,804,954 B2 * | 10/2004 | Osterberg et al. | 60/313 |
| 6,929,081 B2 * | 8/2005 | Pichler et al. | 180/190 |
| D520,423 S | 5/2006 | Poole | |
| 7,051,524 B1 * | 5/2006 | Kraft | 60/324 |
| 7,055,509 B2 | 6/2006 | Hara | |
| 7,152,398 B2 * | 12/2006 | Bassani | 60/313 |
| 7,347,045 B2 * | 3/2008 | Bozmoski et al. | 60/312 |
| 7,503,609 B2 * | 3/2009 | Misaki et al. | 296/37.1 |
| 7,686,122 B2 * | 3/2010 | Nakayama | 180/296 |
| 7,802,907 B2 * | 9/2010 | Uemura et al. | 362/476 |
| 2005/0067211 A1 | 3/2005 | Inaoka et al. | |
| 2005/0081516 A1 | 4/2005 | Inaoka et al. | |
| 2005/0247498 A1 | 11/2005 | Pichler et al. | |
| 2006/0064964 A1 | 3/2006 | Kono et al. | |
| 2007/0181360 A1 * | 8/2007 | Nakayama | 180/309 |
| 2007/0277517 A1 * | 12/2007 | Yamakura et al. | 60/323 |
| 2009/0000282 A1 * | 1/2009 | Gruber | 60/299 |

* cited by examiner

*Primary Examiner*—J. Allen Shriver, II
*Assistant Examiner*—James Triggs
(74) *Attorney, Agent, or Firm*—Ulmer & Berne LLP

(57) ABSTRACT

An exhaust system for a motorcycle includes a muffler configured for attachment at a location substantially beneath a motorcycle engine. The muffler includes a first input port and a second input port. A first exhaust pipe has a first longitudinal length. The first exhaust pipe is configured for extending between and connecting the first input port and a first exhaust port of a first motorcycle engine cylinder while being substantially entirely disposed forwardly of a motorcycle engine. A second exhaust pipe has a second longitudinal length substantially equal to the first longitudinal length. The second exhaust pipe is configured for extending between and connecting the second input port and a second exhaust port of a second motorcycle engine cylinder. A motorcycle including an exhaust system is also provided.

20 Claims, 2 Drawing Sheets

EXHAUST SYSTEMS AND MOTORCYCLES INCLUDING SAME

TECHNICAL FIELD

An exhaust system is provided for a motorcycle.

BACKGROUND

On a motorcycle having a two-cylinder engine, when joining the exhaust ports of both cylinders into a single muffler, in order to achieve optimal acoustic characteristics, it is generally desirable that the flow distances be substantially equal from each exhaust port to the entrance of the muffler. However, many conventional motorcycles including such a configuration incorporate excessive bulk.

SUMMARY

In accordance with one embodiment, a motorcycle comprises a frame extending between a forward end and a rearward end. An engine is supported with respect to the frame and has a first cylinder and a second cylinder. The first cylinder has a first exhaust port and the second cylinder has a second exhaust port. The first exhaust port is more closely adjacent than the second exhaust port to the forward end of the frame. A muffler is disposed at a location substantially beneath the engine. The muffler comprises a first input port and a second input port. A first exhaust pipe extends between and connects the first exhaust port and the first input port. The first exhaust pipe has a first longitudinal length. A second exhaust pipe extends between and connects the second exhaust port and the second input port. The second exhaust pipe has a second longitudinal length substantially equal to the first longitudinal length. Substantially the entire first exhaust pipe is disposed forwardly of the engine with respect to the frame.

In accordance with another embodiment, a motorcycle comprises a frame extending between a forward end and a rearward end. A V-twin engine is supported with respect to the frame and has a first cylinder and a second cylinder. The first cylinder has a first exhaust port and the second cylinder has a second exhaust port. The first cylinder is more closely adjacent than the second cylinder to the forward end of the frame. The first exhaust port is more closely adjacent than the second exhaust port to the forward end of the frame. A muffler is disposed at a location substantially beneath the engine. The muffler comprises a first input port and a second input port. Each of the first input port and the second input port are oriented forwardly with respect to the frame and are disposed more closely adjacent to the first cylinder than the second cylinder. A first exhaust pipe extends between and connects the first exhaust port and the first input port. The first exhaust pipe has a first longitudinal length. A second exhaust pipe extends between and connects the second exhaust port and the second input port. The second exhaust pipe has a second longitudinal length substantially equal to the first longitudinal length. Substantially the entire first exhaust pipe is disposed within a space defined between the engine and a front fork assembly. A substantial portion of the second exhaust pipe is not disposed within the space. A portion of the first exhaust pipe is more closely adjacent than any portion of the second exhaust pipe to any portion of a front fork assembly.

In accordance with yet another embodiment, an exhaust system for a motorcycle comprises a muffler configured for attachment at a location substantially beneath a motorcycle engine. The muffler comprises a first input port and a second input port. A first exhaust pipe has a first longitudinal length. The first exhaust pipe is configured for extending between and connecting the first input port and a first exhaust port of a first motorcycle engine cylinder while being substantially entirely disposed forwardly of a motorcycle engine. A second exhaust pipe has a second longitudinal length substantially equal to the first longitudinal length. The second exhaust pipe is configured for extending between and connecting the second input port and a second exhaust port of a second motorcycle engine cylinder.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
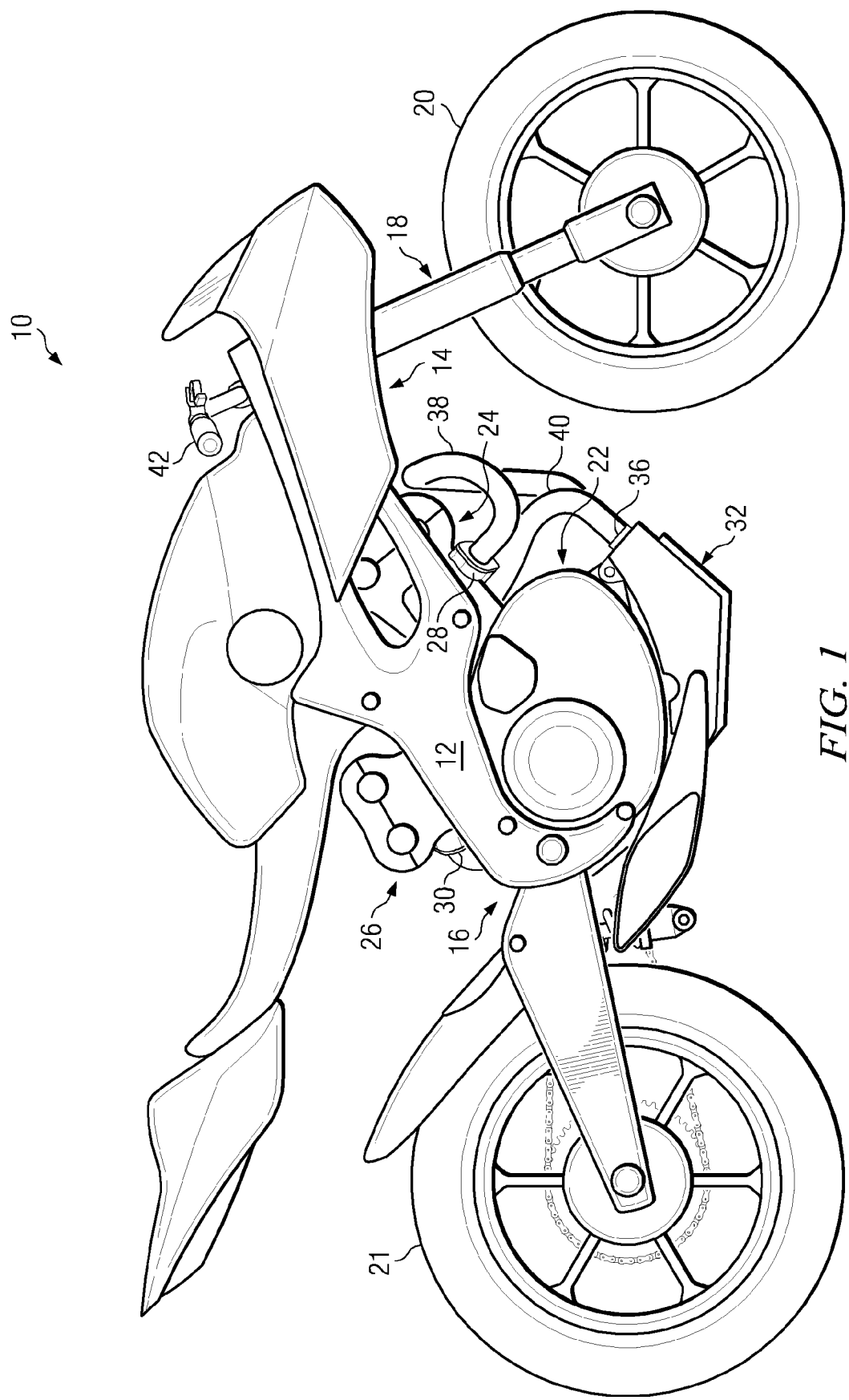
FIG. 1 is a right side elevational view depicting a motorcycle having an exhaust system in accordance with one embodiment.
Figure 2:
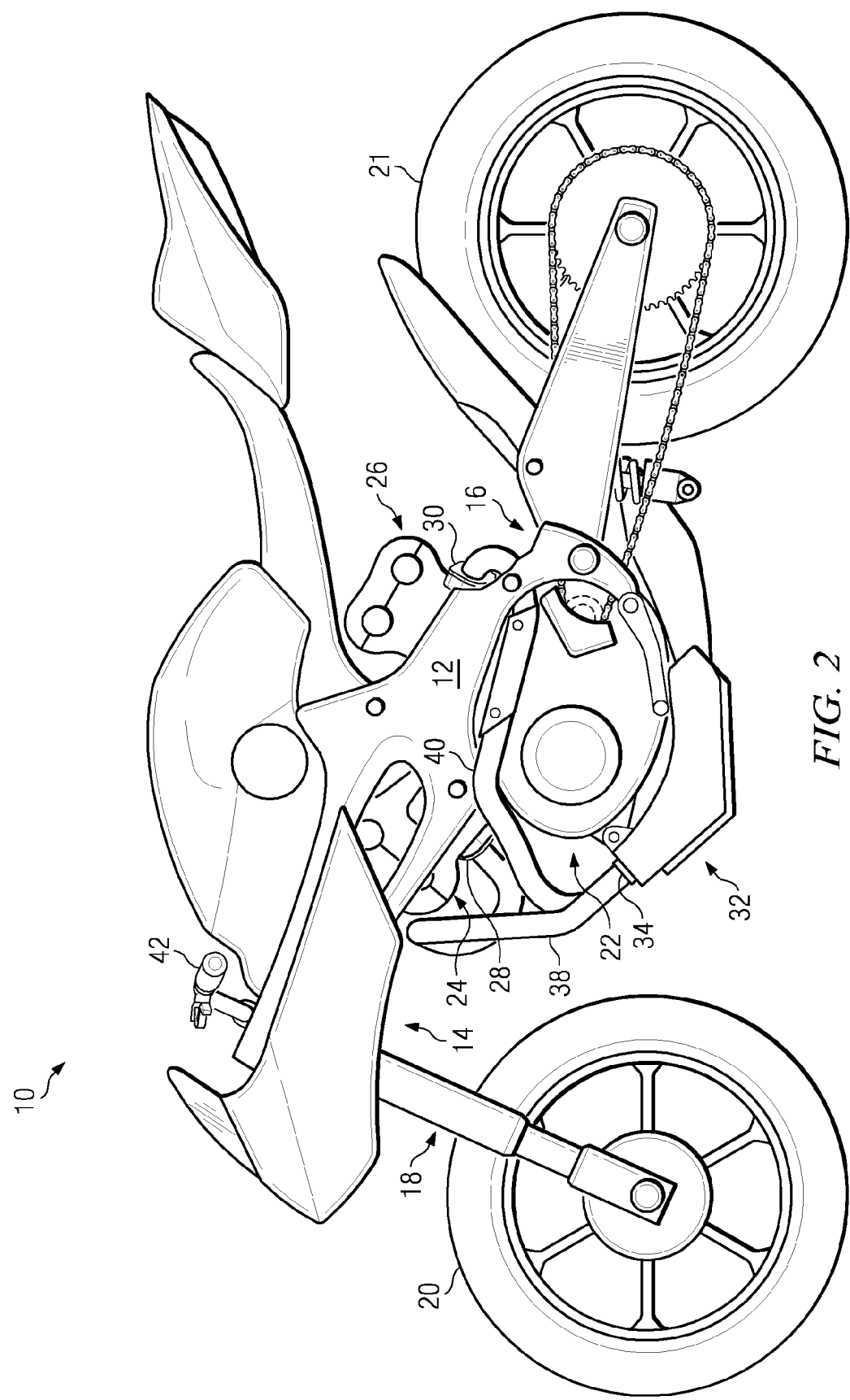
FIG. 2 is a left side elevational view depicting the motorcycle of FIG. 1, wherein a portion of the motorcycle frame adjacent to the second cylinder of the engine is shown to be broken out for clarity of illustration of the second exhaust port of the engine.

Embodiments are hereinafter described in detail in connection with the views of FIGS. 1-2, wherein like numbers indicate the same or corresponding elements throughout the views. A motorcycle in accordance with one embodiment includes an exhaust system having multiple exhaust pipes connecting an engine to a muffler. One such motorcycle 10 is depicted in the example of FIGS. 1-2. As shown in FIGS. 1-2, the motorcycle 10 has a frame 12 which extends between a forward end 14 and a rearward end 16. The motorcycle 10 also includes a front fork assembly 18 having a front wheel 20. The front fork assembly 18 is shown to be supported with respect to the frame 12 adjacent to the forward end 14 of the frame 12. In one embodiment, the front fork assembly 18 is rotatable by an operator through use of a handlebar assembly 42 to facilitate steering of the motorcycle 10. A rear wheel 21 can be supported with respect to the frame 12 adjacent to the rearward end 16 of the frame 12.

The motorcycle 10 also comprises an engine 22 which is supported with respect to the frame 12. In one embodiment, as shown in FIGS. 1-2, the engine 22 can be attached to the frame 12 substantially between the forward end 14 and rearward end 16 of the frame 12. However, it will be appreciated that an engine may be attached or otherwise supported with respect to the frame in any of a variety of alternative configurations. The engine 22 can comprise an internal combustion engine such as a V-type engine having first and second cylinders 24 and 26 (i.e., a V-twin engine). The first cylinder 24 can have a first exhaust port 28 and the second cylinder 26 can have a second exhaust port 30. In one embodiment, as shown in FIGS. 1-2, the first cylinder 24 can be more closely adjacent than the second cylinder 26 to the forward end 14 of the frame 12. In another embodiment, as also shown in FIGS. 1-2, the first exhaust port 28 can be more closely adjacent than the second exhaust port 30 to the forward end 14 of the frame 12. It will be appreciated that the engine 22 can be configured to consume gasoline, diesel fuel, kerosene, natural gas, propane, alcohol, jet fuel, hydrogen, and/or any of a variety of other fuels.

The motorcycle 10 also includes a muffler 32 which, in one embodiment, can be disposed at a location substantially beneath the engine 22, as shown in FIGS. 1-2. In one embodiment, as shown in FIGS. 1-2, the muffler 32 can be attached to the engine 22. However, in certain other embodiments, the muffler 32 can be attached to another component of a motorcycle (e.g., directly or indirectly to the frame 12) at a location substantially beneath the engine 22 or at some other location. When disposed at a location substantially beneath the engine 22, as shown in FIGS. 1-2, it will be appreciated that the muffler 32 can provide a guard to protect the bottom of the engine 22 from debris and road obstacles. The muffler 32 is shown to comprise a first input port 34 and a second input port 36. In one embodiment, as shown in FIGS. 1-2, each of the first and second input ports 34 and 36 of the muffler 32 are oriented forwardly with respect to the frame 12 and are disposed more closely adjacent to the first cylinder 24 of the engine 22 than to the second cylinder 26 of the engine 22.

A first exhaust pipe 38 can be provided to extend between and connect the first exhaust port 28 of the engine 22 and the first input port 34 of the muffler 32. Likewise, a second exhaust pipe 40 can be provided to extend between and connect the second exhaust port 30 of the engine 22 and the second input port 36 of the muffler 32. The first exhaust pipe 38 has a first longitudinal length which is the travel distance through the first exhaust pipe 38 for exhaust moving from the first exhaust port 28 of the engine 22 to the first input port 34 of the muffler 32. The second exhaust pipe 40 has a second longitudinal length which is the travel distance through the second exhaust pipe 40 for exhaust moving from the second exhaust port 30 of the engine 22 to the second input port 36 of the muffler 32. In one embodiment, as shown in the example of FIGS. 1-2, the first longitudinal length can be substantially equal to the second longitudinal length. It will be appreciated that such an exhaust system having first and second exhaust pipes of substantially equal longitudinal length can exhibit significant acoustical advantages as compared with exhaust systems in which exhaust pipes of differing lengths are connected with a common muffler.

As the first cylinder 24 and the first exhaust port 28 are shown in FIGS. 1-2 to be more closely adjacent than the second cylinder 26 and the second exhaust port 30 to the forward end 14 of the frame 12, and as both the first and second input ports 34 and 36 of the muffler are shown to be similarly positioned relative the forward end 14 of the frame 12, it will be appreciated that the minimum exhaust pipe length needed to connect the first exhaust port 28 and the first input port 34, in this embodiment, is shorter than the minimum exhaust pipe length needed to connect the second exhaust port 30 and the second input port 36. However, when both the first and second exhaust pipes 38 and 40 are provided to have a substantially equal longitudinal length, it will be appreciated that the first exhaust pipe 38 can have more longitudinal length than the minimum exhaust pipe length needed to span the distance between the first exhaust port 28 and the first input port 34. In one embodiment, this excess in longitudinal length of the first exhaust pipe 38 can be consumed by providing multiple bends in the first exhaust pipe 38 as shown, for example, in the embodiment of FIGS. 1-2.

In one embodiment, as shown in FIGS. 1-2, the first exhaust pipe 38 extends from the first exhaust port 28 of the engine 22, forwardly and then upwardly toward the front fork assembly 18, laterally across at least a portion of a width of the motorcycle 10, and downwardly into the first input port 34 of the muffler 32. In this configuration, as shown in FIGS. 1-2, substantially the entire first exhaust pipe 38 can be disposed forwardly of the engine 22 with respect to the frame 12. Also, as shown in FIGS. 1-2, substantially the entire first exhaust pipe 38 can be disposed within a space defined between the front fork assembly 18 and the engine 22. By providing substantially the entire first exhaust pipe 38 forwardly of the engine 22 with respect to the frame 12, and within a space defined between the front fork assembly 18 and the engine 22, it will be appreciated that an operator of the motorcycle 10 may more easily be able to avoid inadvertent contact with the first exhaust pipe 38, and potential burns resulting from such contact. Such a configuration can also provide advantages in terms of serviceability of the engine 22, the muffler 32, the first exhaust pipe 28, and/or other components of the motorcycle 10, improved cooling of the first exhaust pipe 28, and improved overall aesthetics for the motorcycle 10.

In one embodiment, as also shown in FIGS. 1-2, while the first exhaust pipe 38 can include multiple bends to provide an excess in longitudinal length over the minimum exhaust pipe length needed to connect the first exhaust port 28 and the first input port 34, the second exhaust pipe 40 can be routed substantially directly from the second exhaust port 30 to the second input port 36. Accordingly, by providing the second exhaust pipe 40 in a substantially direct route between the second exhaust port 30 and the second input port 36, as shown in FIGS. 1-2, the substantially equal longitudinal length of both the first and second exhaust pipes 38 and 40 can be minimized, and the excess longitudinal length of the first exhaust pipe 38 can be minimized. To achieve a substantially direct route for the second exhaust pipe 40, it may be desirable to position the second exhaust pipe 40 as closely to the engine 22 as possible to conserve longitudinal length of the second exhaust pipe 40. For example, to this end, the second exhaust pipe 40 can pass within a space between the first exhaust pipe 38 and the engine 22, as shown in FIGS. 1-2. Also, a portion of the first exhaust pipe 38 can be located more closely adjacent than any portion of the second exhaust pipe 40 to any portion of the front fork assembly 18, as also shown in FIGS. 1-2. Additionally, as shown most clearly in FIG. 2, a substantial portion of the second exhaust pipe 40 may not be disposed within a space defined between the front fork assembly 18 and the engine 22 (e.g., because a significant portion of the second exhaust pipe 40 extends alongside the engine 22 when leading to the second exhaust port 30). It will be appreciated that the first exhaust pipe and the second exhaust pipe may be configured and/or arranged in any of a variety of alternative configurations in accordance with other embodiments.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:
1. A motorcycle comprising:
 a frame extending between a forward end and a rearward end;
 an engine supported with respect to the frame and having a first cylinder and a second cylinder, wherein the first cylinder has a first exhaust port and the second cylinder has a second exhaust port, and the first exhaust port is more closely adjacent than the second exhaust port to the forward end of the frame;

a muffler disposed at a location substantially beneath the engine, wherein the muffler comprises a first input port and a second input port;

a first exhaust pipe extending between and connecting the first exhaust port and the first input port, wherein the first exhaust pipe has a first longitudinal length; and a second exhaust pipe extending between and connecting the second exhaust port and the second input port, wherein the second exhaust pipe has a second longitudinal length substantially equal to the first longitudinal length; wherein substantially the entire first exhaust pipe is disposed forwardly of the engine with respect to the frame; and the first exhaust pipe extends from the first exhaust port, forwardly and then upwardly toward a front fork assembly, laterally across at least a portion of a width of the motorcycle, and downwardly into the first input port of the muffler.

2. The motorcycle of claim 1 wherein substantially the entire first exhaust pipe is disposed within a space defined between the engine and a front fork assembly.

3. The motorcycle of claim 1 wherein the second exhaust pipe extends from the second exhaust port, forwardly to a space defined between the engine and a front fork assembly, and downwardly into the second input port of the muffler.

4. The motorcycle of claim 3 wherein a substantial portion of the second exhaust pipe is not disposed within the space.

5. The motorcycle of claim 4 wherein a portion of the first exhaust pipe is more closely adjacent than any portion of the second exhaust pipe to any portion of a front fork assembly.

6. The motorcycle of claim 5 wherein the second exhaust pipe passes within a space between the first exhaust pipe and the engine.

7. The motorcycle of claim 1 wherein the first cylinder is more closely adjacent than the second cylinder to the forward end of the frame.

8. The motorcycle of claim 1 wherein the engine comprises a V-type engine.

9. The motorcycle of claim 8 wherein the engine comprises a V-twin engine.

10. The motorcycle of claim 9 wherein the engine is attached to the frame substantially between the forward and rearward ends of the frame, and wherein the muffler is attached to the engine.

11. The motorcycle of claim 1 further comprising a rear wheel supported with respect to the frame adjacent to the rearward end of the frame.

12. The motorcycle of claim 1 wherein each of the first and second input ports of the muffler are oriented forwardly with respect to the frame and are disposed more closely adjacent to the first cylinder of the engine than to the second cylinder of the engine.

13. An exhaust system for a motorcycle, the exhaust system comprising:

a muffler configured for attachment at a location substantially beneath a motorcycle engine, wherein the muffler comprises a first input port and a second input port;

a first exhaust pipe having a first longitudinal length, wherein the first exhaust pipe is configured for extending between and connecting the first input port and an exhaust port of a first motorcycle engine cylinder while being substantially entirely disposed forwardly of a motorcycle engine; and a second exhaust pipe having a second longitudinal length substantially equal to the first longitudinal length, wherein the second exhaust pipe is configured for extending between and connecting the second input port and an exhaust port of a second motorcycle engine cylinder;

wherein the first exhaust pipe is configured to extend from an exhaust port of a first motorcycle engine cylinder, forwardly and then upwardly toward a motorcycle front fork assembly, laterally across at least a portion of a width of a motorcycle, and downwardly into the first input port of the muffler.

14. The exhaust system of claim 13 wherein the first exhaust pipe is configured to be substantially disposed within a space defined between a motorcycle front fork assembly and a motorcycle engine.

15. The exhaust system of claim 13 wherein the second exhaust pipe is configured to extend from an exhaust port of a second motorcycle engine cylinder, forwardly to a space defined between a motorcycle front fork assembly and a motorcycle engine, and downwardly into the second input port of the muffler.

16. The exhaust system of claim 13 wherein the first input port and the second input port are both configured for forward orientation upon attachment of the muffler substantially beneath a motorcycle engine.

17. The motorcycle of claim 6 wherein each of the first and second input ports of the muffler are oriented forwardly with respect to the frame and are disposed more closely adjacent to the first cylinder of the engine than to the second cylinder of the engine.

18. The motorcycle of claim 17 wherein the engine comprises a V-type engine.

19. The motorcycle of claim 18 wherein the engine comprises a V-twin engine.

20. The motorcycle of claim 19 wherein the engine is attached to the frame substantially between the forward and rearward ends of the frame, and wherein the muffler is attached to the engine.

* * * * *